United States Patent [19]

Land

[11] 4,007,470
[45] Feb. 8, 1977

[54] BATTERY OPERATED CAMERA HAVING A HANDLE THEREON FORMED IN PART BY AN EXTERNAL BATTERY

[75] Inventor: Edwin H. Land, Cambridge, Mass.

[73] Assignee: Polaroid Corporation, Cambridge, Mass.

[22] Filed: Dec. 19, 1974

[21] Appl. No.: 534,444

[52] U.S. Cl. .............................. 354/293; 352/243; 354/354

[51] Int. Cl.² ...................................... G03B 17/56

[58] Field of Search ..................... 354/293, 81–82; 352/243; 136/173, 181

[56] References Cited

UNITED STATES PATENTS

| | | | |
|---|---|---|---|
| 2,303,988 | 12/1942 | Christensen | 136/173 |
| 3,301,627 | 1/1967 | Kimura | 354/82 |
| 3,852,788 | 12/1974 | Ueda | 354/293 |
| 3,858,228 | 12/1974 | Mito | 354/293 |
| 3,864,711 | 2/1975 | Matthews | 354/354 |
| 3,887,393 | 6/1975 | LaRue, Jr. | 136/173 |

Primary Examiner—L. T. Hix
Assistant Examiner—J. A. LaBarre
Attorney, Agent, or Firm—John S. Vale

[57] ABSTRACT

A battery operated camera includes a carrying strap having members thereon for receiving the opposite ends of a battery for powering electrical components of the camera. The battery includes structure thereon for attaching it to the carrying strap so that a major portion of the battery serves as a carrying handle on the strap.

14 Claims, 5 Drawing Figures

BATTERY OPERATED CAMERA HAVING A HANDLE THEREON FORMED IN PART BY AN EXTERNAL BATTERY

BACKGROUND OF THE INVENTION

1. Field of the Invention

The present invention relates to the field of photography and, more specifically, to battery operated cameras.

2. Description of the Prior Art

The present trend in the camera field is toward miniaturized and highly automated, electrically operated and controlled cameras. While the physical size of the cameras is decreasing, the requirement for electrical energy or battery capacity is rapidly expanding. This is particularly true in the self-developing camera field wherein automated cameras include high-drain rate motors for driving the pressure applying rollers which advance a film unit therebetween to distribute a fluid processing composition within the film unit.

One solution to the problem is to provide a thin flat battery in the camera or film pack capable of delivering high rates of current and sufficient energy to expose and process all of the film units (usually 10) in the film container, after which, the battery is discarded. For an example of a camera which is adapted to be powered by a battery in a film container, see U.S. Pat. No. 3,774,516, issued to J. P. Burgarella, et al. on Nov. 27, 1974.

The present invention is directed to an alternative self-developing camera system wherein a battery is mounted externally of the camera housing.

The prior art is replete with cameras or camera systems which use an external battery or battery pack for powering the camera and/or an artifical lighting system. Generally, these arrangements are bulky and awkward to use. The most commonly observed system is a high voltage battery pack for powering a high intensity strobe lighting unit. The heavy battery pack is usually suspended from the photographer's belt. Other systems include large battery holders attached to the camera housing or a camera flash unit. For an example of an underwater light system incorporating an auxilliary battery pack, see U.S. Pat. No. 2,872,622.

SUMMARY OF THE INVENTION

In a copending application of M. S. Dietz and W. J. McCune, Ser. No. 534,445 filed on even date herewith, there is disclosed the concept of a battery operated camera which include a carrying or neck strap having a handle thereon for receiving and supporting an external electrical battery for powering the camera.

The present invention is an improvement of the above-described concept wherein the carrying strap includes a pair of opposed members or end caps for receiving only a portion of an elongated battery. When so supported, the major portion of the battery, intermediate the opposed ends, serves as a handle for conveniently gripping the carrying strap.

The present invention also provides an elongated battery having conductive battery terminals at the leading end thereof for establishing a physical connection to one of the end caps and an electrical connection to electrically operated components of the camera and further includes at least one connector at the trailing end of the battery that is adapted to mate with a complementary connector on the other end cap to establish a physical connection therebetween.

Therefore it is an object of the present invention to provide a battery operated camera including a carrying strap that has means thereon for receiving and supporting a portion of an elongated battery so that a major portion of the battery, so supported thereon, forms a carrying handle on the strap.

It is another object of the invention to provide an elongated battery that is specially configured to be attached to means on a camera carrying strap such that it forms a handle thereon.

Other objects of the invention will in part be obvious and will in part appear hereinafter.

BRIEF DESCRIPTION OF THE DRAWINGS

For a fuller understanding of the nature and objects of the invention, reference should be had to the following detailed description taken in connection with the accompanying drawings wherein.

DESCRIPTION OF THE PREFERRED EMBODIMENTS

The present invention relates to battery-powered cameras and more specifically to means and methods for attaching and electrically connecting an external electrical battery to such a camera.

Figure 1:
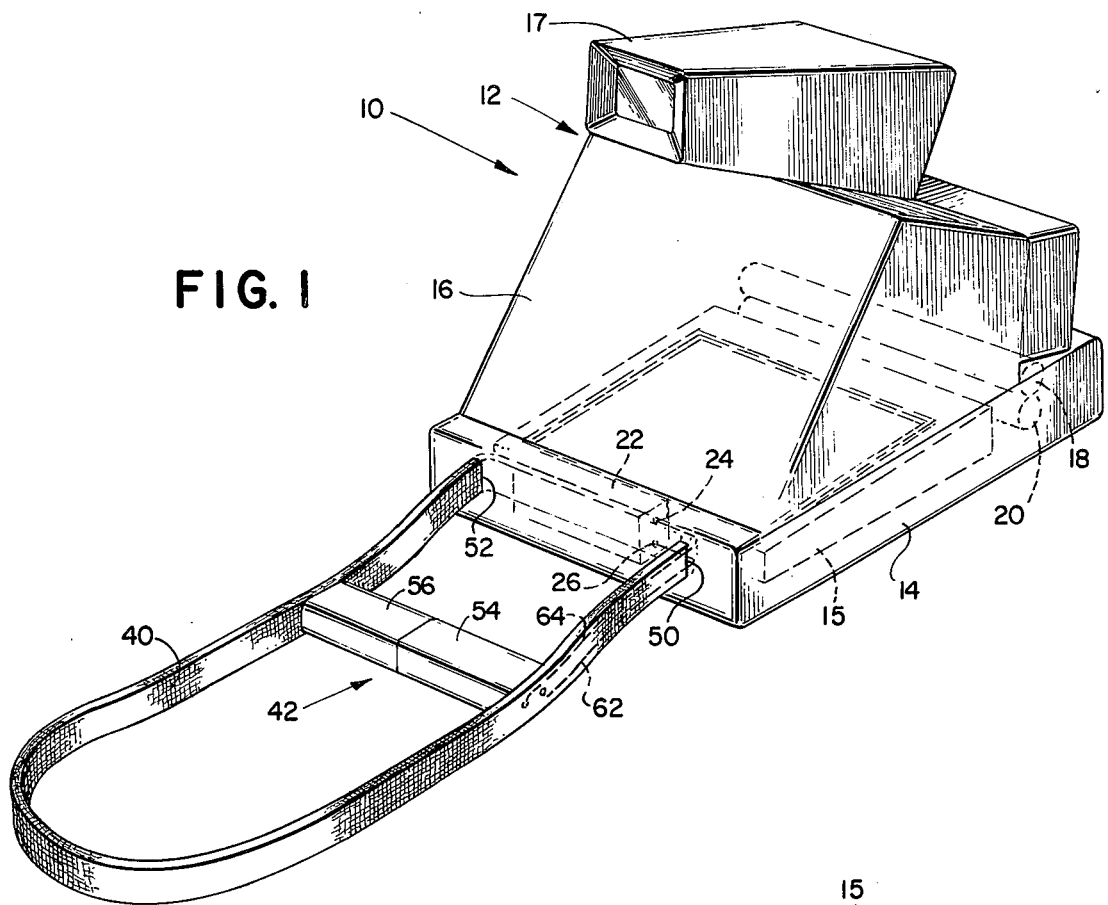
FIG. 1 is a perspective view of a battery operated camera having a carrying strap thereon and a handle on the strap for receiving and supporting an electrical battery.

FIG. 1 of the drawings shows a camera 10 which is enclosed by a camera housing 12 that may be of the folding or nonfolding type.

The illustrated camera 10 is of the self-developing type but the inventive concepts to be described hereinafter apply equally to more conventional battery operated cameras as well.

Camera 10 includes a base section 14 having a chamber therein for receiving and supporting a film container 15 (shown in dotted lines) holding a plurality of film units of the self-developing type, an example of which is disclosed in U.S. Pat. No. 3,415,644 issued to E. H. Land on December 10, 1968.

The upper portion 16 of camera housing 12 defines an exposure chamber and mounts a viewing device 17 and exposure means including a lens, shutter and image-reversal mirror (not shown) for exposing the forwardmost film unit in the film container 15 located in base 14.

Subsequent to exposure, a film advance device (not shown) engages the forwardmost film unit and advances it forwardly to a pair of pressure applying rollers 18 and 20 between which the film unit is advanced to distribute a fluid processing composition between predetermined layers of the film unit. From the rollers 18 and 20, the film unit is advanced through a film exit slot (not shown) at the forward end of the camera.

The illustrated camera 10 is intended to represent a general class of highly automated, battery-operated, self-developing cameras, an example of which may be found in U.S. Pat. No. 3,774,516.

These cameras have a plurality of electrically operated components including: a motor for driving the film advanced device and rollers 18 and 20; an electronic logic and power system for powering and controlling the sequence of events making up a cycle of camera operation; an exposure control circuit including a photocell for automatically terminating exposure in response to evaluating scene lighting conditions; and a flash system for providing auxiliary illumination when required. The above-described electrically operated components, systems, and/or circuits are diagrammatically illustrated in FIGS. 1 and 2 of the drawings as an electrical component or circuit 22 located in base section 14.

Figure 2:
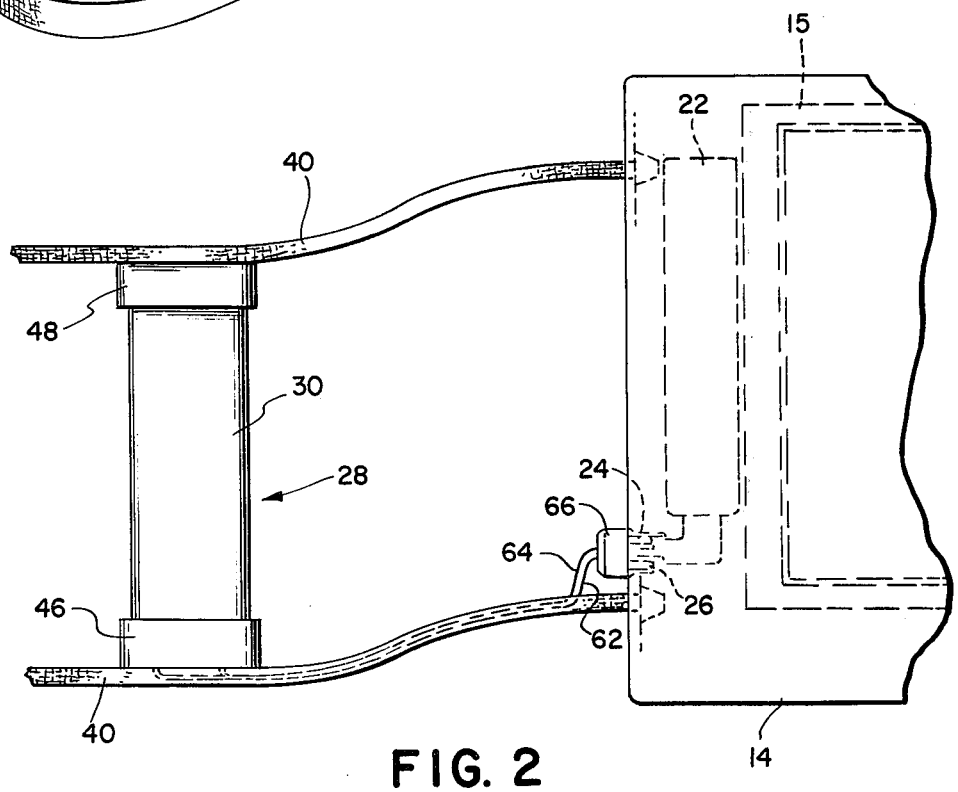
FIG. 2 is an elevational view of a portion of a battery operated camera having a carrying strap attached thereto and showing a pair of end caps on the strap which hold opposite ends of a battery in position such that the major portion of the battery serves as a carrying handle.

Component or circuit 22 has a pair of electrically conductive terminals 24 and 26, electrically coupled thereto, and to which an electrical battery is adapted to be electrically connected for powering component or circuit 22. These terminals 24 and 26 may be located within base section 14 (as shown in FIG. 1) or may be accessible from the exterior of camera housing 12 (as shown in FIG. 2).

One method of supplying power to circuit or component 22 is to provide an electrical battery in the bottom of a film container 15, the terminals of which are automatically connected to terminals (similar to terminals 24 and 26 but mounted on the bottom wall of base section 14) when the film container 15 is fully inserted into its operative position in base section 14. Such a system is disclosed in the aforementioned U.S. Pat. No. 3,774,516.

The present invention provides a battery-operated camera which has a carrying strap attached thereto and includes means on the strap configured to hold a relatively large capacity battery for supplying sufficient power to expose and process many containers of film.

Figure 3:
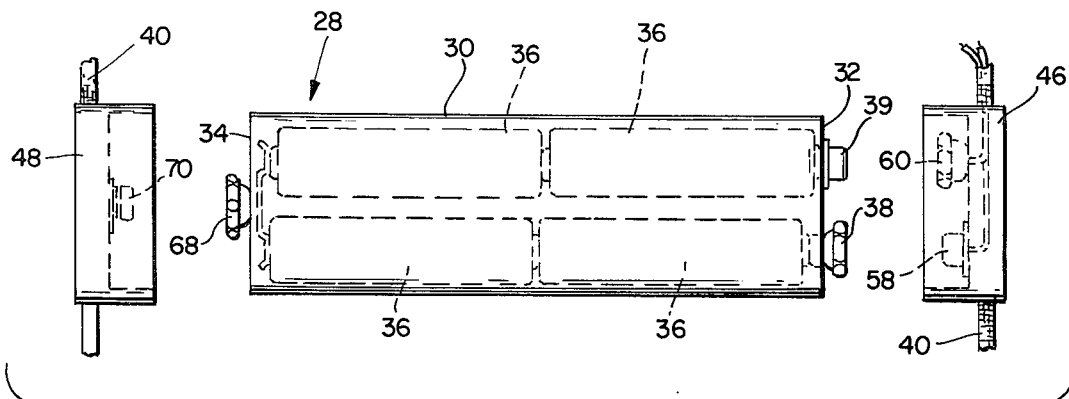
FIG. 3 is an elevational view, shown in exploded fashion of a four-cell battery and the end caps of FIG. 2.

One embodiment of a high capacity battery 28, suitable for powering camera 10 is shown in FIG. 3 of the drawings. It comprises a generally elongated, parallelepiped shaped, hollow integral battery housing or casing 30, having leading and trailing end walls 32 and 34, respectively. Within housing 30 are four elongated, cylindrical, electrochemical cells 36 (preferably 1.5 volt, AA alkaline cells) connected in series to form a 6-volt battery. Plus and minus, female and male, snap-together battery terminals 38 and 39 are provided on the leading end wall 32 of battery housing 30.

In terms of capacity, it has been found that battery 28 will supply power for between 250 and 350 operating cycles of camera 10 depending on the age and condition of cells 36. While battery 28 is shown to be a "factory assembled" unit, it will be understood that battery housing 30 may have an access door therein so that the individual cells 36 may be replaced.

In FIG. 1 of the drawings, camera 10 is shown to include an elongated and flexible carrying or neck strap 40 attached to the trailing end of base section 14 and having a fairly rigid, transverse handle 42 attached to the opposite sides of strap 40 for receiving and supporting a battery 28. In this embodiment, the battery 28 is completely enclosed by handle 42.

In FIG. 2 of the drawings, the neck strap 40 has a pair of opposed end caps 46 and 48 attached thereto for receiving and supporting the leading and trailing ends, respectively, of a battery 28 such that the major portion of the battery housing 30, intermediate the opposite ends, serves as the handle.

The carrying strap 40 may be made of any suitable material such as molded or extruded plastic or a woven material and preferably includes a hollow core such that lead wires for connecting the battery terminals 38 and 39 to the camera terminals 24 and 26 may be concealed therein, as will be described later.

Camera 10 may include a pair of openings 50 and 52 (as shown in FIG. 1) at the trailing end thereof through which strap 40 may pass in a continuous loop to make the connection between strap 40 and camera housing 12. The connection of the free ends of the strap may be made within camera housing 12 or externally by means of an adjustable buckle arrangement. In a camera 10 wherein the camera terminals 24 and 26 are located within housing 12, it is preferable for at least that portion of the strap 40 carrying the lead wire to extend into the base section 14.

Alternatively, the free ends of strap 40 may be directly attached to the trailing end of housing 12, as is shown in FIG. 2 of the drawings, by any suitable means such as snap connectors or split ring arrangements that are well known in the photographic art.

In the embodiment shown in FIG. 1, the hollow handle 42 may be formed of complementary telescoping or snap-together handle sections 54 and 56 that are dimensioned to receive and support a battery 28 therein. The ends of handle sections 54 and 56 may be attached to the sides of strap 40 by any suitable means such as rivets, friction connectors or the like.

Handle section 54 includes a complementary pair of male and female snap-together connectors therein for receiving the terminals 38 and 39 of battery 28. Although not shown in FIG. 1, these connectors are similar to a pair of connectors 58 and 60 shown in an end cap 46 in FIG. 3 of the drawings.

Concealed in the hollow core of strap 40 and having one end thereof electrically connected to the connectors in handle section 54 are a pair of lead wires 62 and 64, the opposite ends of which are connected to the camera terminals 24 and 26. Wires 62 and 64 serve as the means for electrically connecting the battery 28 to the camera component or circuit 22.

Where the terminals 24 and 26 are accessible from the exterior of camera housing 12, the wires 62 and 64 may exit from the strap 40 at a location in the vicinity of terminals 24 and 26 and terminate in a connecting plug 66 (see FIG. 2).

In a preferred embodiment, handle 42 is positioned on strap 40 at a point that is fairly close to the trailing end of camera 10 thus providing a convenient hand hold on strap 40 as an alternative to wearing camera 10 about the neck.

The handle sections 54 and 56 may be made of any suitable material such as plastic and preferably are of molded construction. While handle 42 has been shown to receive and support a factory assembled four cell battery 28, it is within the scope of the present invention to provide a handle 42 that is configured to receive four individual cells that may be individually replaced when they become exhausted.

The embodiment shown in FIG. 2 of the drawings includes end caps 46 and 48 for receiving and supporting opposite ends of a battery 28. The end caps are preferably of molded plastic construction and are dimensioned to receive the respective leading and trailing ends of battery 28.

The first or leading end cap 46 includes the battery connectors 58 and 60 therein. When the leading end of battery 28 is inserted therein, a physical connection is established between the leading end of the battery 28 and the first end cap 46 by means of the complementary connectors. This same connection also establishes the electrical connection of battery 28 to the camera terminals 24 and 26 via lead wires 62 and 64.

Figure 4:
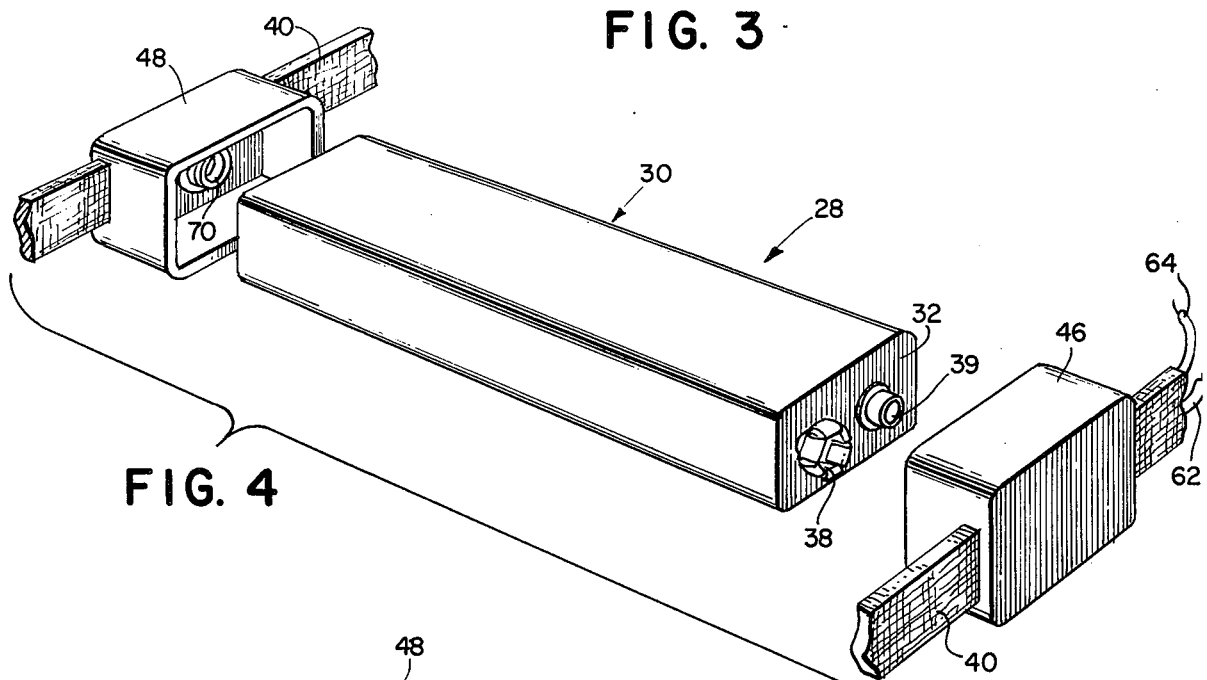
FIG. 4 is a perspective view, shown in exploded fashion of the battery and end caps of FIGS. 2 and 3.

The end caps 46 and 48 may be connected or attached to strap 40 by any suitable means such as rivets, adhesive or thermobonding or friction-type connectors shown in FIGS. 3 and 4 of the drawings.

Various means may be provided for making the physical connection between the trailing end of battery 28 and the second or trailing end cap 48.

One embodiment is to mold end cap 48 so that it closely conforms to the trailing end of battery housing 30 to establish a friction fit therebetween when the trailing end of battery housing 30 is inserted into end cap 48.

It is preferred however to provide a more positive means for making this releasable connection. This is accomplished by providing cooperating connecting or latching structure on the trailing end of battery housing 30 and the end cap 48 which is capable of interlocking in response to these two elements being brought into engagement with each other under the influence of a compressive force.

For example, the battery housing 30 may have one part 68 of a two-part snap-together connector on the trailing end wall 34 thereof which interlocks with the other part 70 of the connector in end cap 48. This type of arrangement is shown in FIGS. 3 and 4 of the drawings.

Figure 5:
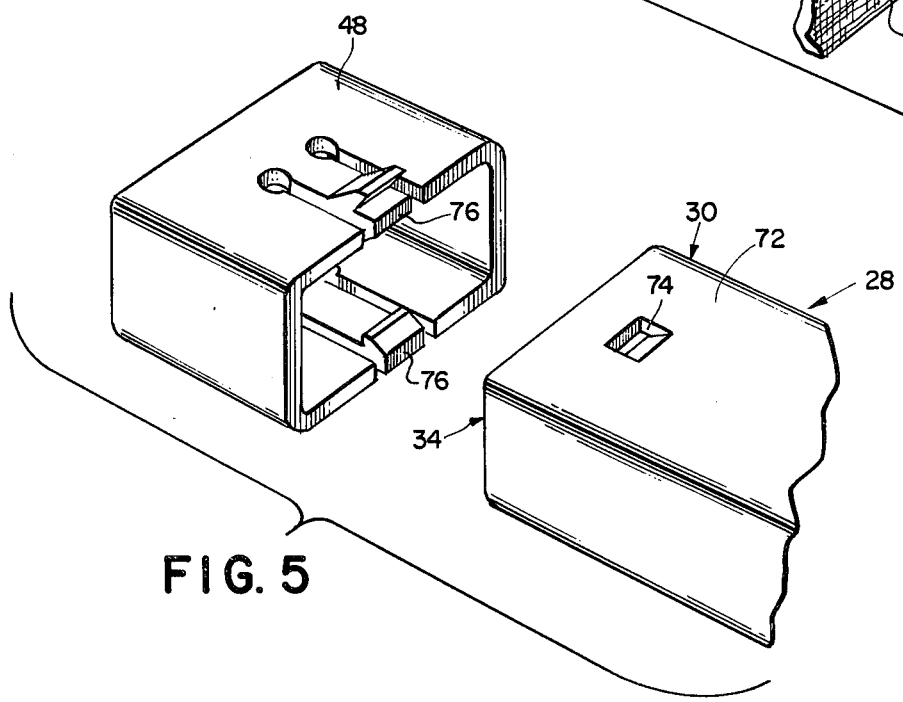
FIG. 5 is a perspective view, shown in exploded fashion, of an alternative embodiment for attaching one end cap to the trailing end of the battery housing.

An alternative embodiment is shown in FIG. 5 of the drawings. A substantially planar wall 72 of battery housing 30 has a recess 74 therein near the trailing end thereof. The end cap 48 includes an integrally molded and resilient tab lock or latch 76 thereon that is adapted to extend into recess 74 when the trailing end of battery housing 30 is inserted into end cap 48. In this manner the cooperating recess 74 and tab latch 76 establish the physical connection. As shown in FIG. 5, the battery housing may include two recesses 74 on opposite sides that are adapted to mate with two such tab latches 76 shown on opposite sides of end cap 48.

As best shown in FIG. 3 the cyclindrical cells 36 are arranged in two side-by-side pairs of end-to-end cells. In a preferred embodiment, the recess 74 is arranged on wall 72 so that it is in interdigitated relationship with an adjacent pair of side-by-side cells therebeneath such that the material forming the recess 74 may extend into the battery housing 30 without contacting the cells therein.

Although not shown in the drawings, it will be understood that there are many two-part interlocking materials such as Velcro (trademark) that may be provided on the trailing end of battery housing 30 and in end cap 48 to establish the physical connection therebetween.

In terms of battery 28, the inventive concept is to provide connecting means on the trailing end thereof for mechanically interlocking with complementary connecting means on the second end cap 48. The term mechanically interlocking means a positive connection and is not intended to include a simple friction fit which may be established by providing battery-engaging surfaces on end cap 48 that closely conform to the exterior surfaces of the trailing end of battery housing 30. It is intended that the trailing end (which includes trailing end wall 34 and portions of the battery housing walls joined to the periphery of end wall 34) of the battery housing 30 have some unique structure thereon or be formed of a unique material not normally found on presently available commercial batteries.

In the illustrated embodiments, the carrying strap 40 has been shown to be an elongated U-shaped member having two ends or portions that are connected to the camera housing. It should be understood, however, that the inventive concepts described herein apply equally as well to a single carrying strap having only one point of connection to the camera housing. Such a single carrying strap may have a handle thereon for receiving and supporting a battery or, in the alternative, may have a single end cap (such as end cap 46) for receiving and supporting only a portion of the battery so that a battery so supported thereon serves as the handle.

The previously mentioned copending application, Ser. No. 534,445 discloses the concept of a convertible handle which may be alternatively connected across or along one side of the carrying strap. It should be understood that it is within the inventive concepts of the present invention to provide a trailing end cap 48 and suitable connectors (at least two) at different locations on the strap to provide such a convertible feature.

Since certain changes may be made in the above photographic film assemblage and photographic apparatus without departing from the scope of the invention herein involved, it is intended that all matter contained in the above description or shown in the accompanying drawings shall be interpreted as illustrative and not in a limiting sense.

What is claimed is:

1. A battery operated camera having at least one component that is adapted to be powered by an elongated electrical battery having leading and trailing ends together with an integral casing therearound, said camera comprising:

a camera housing;

electrically conductive terminal means, electrically connected to the at least one component and to which such an electrical battery is to be electrically connected to supply power to the at least one component;

a camera carrying strap being connectable to said camera housing for facilitating carrying said camera;

means for connecting said carrying strap to said camera housing;

means on said carrying strap for respectively receiving and supporting the leading and trailing ends of such an electrical battery such that a portion of the integral battery casing intermediate the leading and trailing ends thereof forms a handle on said carrying strap when the battery is so supported; and means for electrically connecting such a battery, when the battery is supported by said battery support means to said electrically conductive terminal means of said at least one component.

2. A battery operated camera as defined in claim 1 wherein said means for receiving and supporting such an electrical battery include first and second end caps for receiving and supporting, respectively, the leading and trailing ends of such an electrical battery.

3. A battery operated camera as defined in claim 2 wherein the battery includes a pair of electrically conductive snap-together terminals at the leading end thereof and said first end cap includes a portion of said electrically connecting means including a complementary pair of conductive snap-together terminals for mating with the terminals on the battery when the leading end of the battery is supported by said first end cap thereby establishing a physical connection between said first end cap and the battery and an electrical connection to the battery terminals.

4. A battery operated camera as defined in claim 3 wherein said second end cap for receiving the trailing end of the battery is dimensioned to frictionally engage the trailing end of the battery casing to establish a physical connection between the trailing end of the battery and said second end cap.

5. A battery operated camera as defined in claim 3 wherein the trailing end of the battery includes at least one snap-together connector thereon and said second end cap for receiving the trailing end of the battery includes a complementary snap-together connector therein such that the two connectors are joined in response to inserting the trailing end of the battery into said second end cap thereby establishing a physical connection between said second end cap and the trailing end of the battery.

6. A battery operated camera as defined in claim 3 wherein the trailing end of the battery includes a first portion of pressure interlocking means and said second end cap includes a second portion of said pressure interlocking means that is adapted to interlock with said first portion for establishing a physical connection between the trailing end of the battery and said second end cap.

7. A battery operated camera as defined in claim 3 wherein the trailing end of the battery includes a recess therein and said second end cap includes a latching member configured to extend into the recess when the trailing end of the battery is inserted into said second end cap to establish a physical connection between said second end cap and the trailing end of the battery.

8. An electrical battery for use with an electrically operated camera of the type having a carrying strap thereon and first and second members on the carrying strap for respectively receiving opposite ends of said battery such that a portion of said battery intermediate its said opposite ends serves as a carrying handle to facilitate gripping the carrying strap and said battery is electrically connected to the camera when so supported on the carrying strap; said electrical battery comprising:

an integral battery casing having leading and trailing ends;

at least one electrochemical cell within said battery casing for providing electrical energy;

a pair of battery terminals on said leading end of said battery casing being electrically connected to said at least one cell within said casing and being configured to be connected to the first member on the carrying strap to establish a physical connection between said leading end of said battery casing and the first member on the carrying strap and an electrical connection between said battery and the camera; and connecting means on said trailing end of said battery casing for engaging and mechanically interlocking with complementary connecting means on the second member thereby establishing a physical connection to the second member on the carrying strap such that a portion of said battery casing intermediate said leading and trailing ends thereof, serves as a handle on the carrying strap when said battery is supported thereon.

9. A battery as defined in claim 8 wherein said battery casing is an elongated structure and said battery terminals include a pair of electrically conductive connectors of the snap-together type that are adapted to be connected to a complementary pair of such connectors on the first receiving member of the strap.

10. A battery as defined in claim 9 wherein said connecting means on said trailing end of said battery casing includes at least one part of a two-part snap-together connector, the other part thereof being on the second receiving member on the strap.

11. A battery as defined in claim 9 wherein said connecting means on said trailing end of said battery casing includes a recess therein into which a latching member on the second receiving member is adapted to extend to engage said battery casing and establish the physical connection between said trailing end of said battery casing and the second receiving member.

12. A battery as defined in claim 11 including at least two cylindrical cells arranged in side-by-side relation within said battery casing and said battery casing includes a substantially planar wall section in overlying relation to said pair of cylindrical cells, said recess being disposed in said planar wall section in an interdigitated relationship with said pair of cylindrical cells therebeneath.

13. An assembly for attaching an external battery of the type having an integral casing therearound to a battery operated camera of the type including a camera housing and terminal means to which a battery is to be electrically connected to supply power to the camera, said assembly comprising:

a carrying strap for facilitating carrying such a camera and including means thereon for attaching said carrying strap to the camera housing;

means on said carrying strap for receiving and supporting such a battery such that a portion of the battery casing intermediate opposite ends thereof serves as a handle for facilitating gripping of said carrying strap; and means for electrically connecting such a battery, when supported by said receiving and supporting means, to the terminal means of the camera.

14. An assembly as defined in claim 13 wherein at least a major portion of said electrically connecting means is internal of said strap.

* * * * *

Disclaimer 4,007,470.—*Edwin H. Land*, Cambridge, Mass. BATTERY OPERATED CAMERA HAVING A HANDLE THEREON FORMED IN PART BY AN EXTERNAL BATTERY. Patent dated Feb. 8, 1977. Disclaimer filed Dec. 12, 1977, by the assignee, *Polaroid Corporation*.

Hereby enters this disclaimer to claims 13 and 14 of said patent.

[*Official Gazette March 28, 1978.*]